(12) United States Patent
Suzuki

(10) Patent No.: US 10,358,105 B2
(45) Date of Patent: Jul. 23, 2019

(54) SHOCK ABSORBING STRUCTURE OF VEHICLE DOOR

(71) Applicant: TOYOTA BOSHOKU KABUSHIKI KAISHA, Aichi-ken (JP)

(72) Inventor: Toshihiro Suzuki, Aichi-ken (JP)

(73) Assignee: Toyota Boshoku Kabushiki Kaisha, Aichi-ken (JP)

(*) Notice: Subject to any disclaimer, the term of this patent is extended or adjusted under 35 U.S.C. 154(b) by 0 days.

(21) Appl. No.: 15/752,799

(22) PCT Filed: May 19, 2016

(86) PCT No.: PCT/JP2016/064822
§ 371 (c)(1),
(2) Date: Feb. 14, 2018

(87) PCT Pub. No.: WO2017/033511
PCT Pub. Date: Mar. 2, 2017

(65) Prior Publication Data
US 2018/0244232 A1    Aug. 30, 2018

(30) Foreign Application Priority Data
Aug. 21, 2015 (JP) .................... 2015-163743

(51) Int. Cl.
*B60J 5/04* (2006.01)
*B60R 21/04* (2006.01)

(52) U.S. Cl.
CPC ........... *B60R 21/0428* (2013.01); *B60J 5/045* (2013.01); *B60J 5/0451* (2013.01); *B60J 5/0461* (2013.01);
(Continued)

(58) Field of Classification Search
CPC ........ B60J 5/0416; B60J 5/0451; B60J 5/045; B60J 5/0418; B60R 21/0428; B60R 21/04
(Continued)

(56) References Cited

U.S. PATENT DOCUMENTS 6,725,606 B2 *   4/2004   Nishikawa ............. B60J 5/0416
                                                        49/502
6,938,944 B2 *   9/2005   Koa ........................ B60J 5/0404
                                                        296/1.11
(Continued)

FOREIGN PATENT DOCUMENTS

JP    H06-074427 U    10/1994
JP    H09-071200 A    3/1997
(Continued)

OTHER PUBLICATIONS

Reasons for Refusual in related application No. JP2015-163743, dated Nov. 6, 2018 (along with English-language translation thereof).
(Continued)

*Primary Examiner* — Pinel E Romain
(74) *Attorney, Agent, or Firm* — Greenblum & Bernstein, P.L.C.

(57) ABSTRACT

A shock absorbing structure of a vehicle door including a vehicle body panel with a service hole includes a door trim and a shock absorber. The door trim covers the vehicle body panel from an interior side of a vehicle. The shock absorber is mounted to the vehicle body panel to cover the service hole. The shock absorber includes a shock absorbing portion that is inserted in the service hole. The shock absorbing portion is disposed such that an end of the shock absorbing portion on an exterior side of the vehicle is disposed more to the exterior side of the vehicle than the service hole and between the vehicle body panel and the door trim.

13 Claims, 4 Drawing Sheets

(52) U.S. Cl.
CPC ............ B60R 21/04 (2013.01); *B60J 5/0416* (2013.01); *B60R 2021/0414* (2013.01)

(58) Field of Classification Search
USPC ...................................................... 296/146.6
See application file for complete search history.

(56) References Cited

U.S. PATENT DOCUMENTS

| | | | | |
|---|---|---|---|---|
| 7,198,319 | B2* | 4/2007 | Schroder | B60J 5/0416 296/146.7 |
| 8,029,041 | B2* | 10/2011 | Hall | B60J 5/0451 296/146.6 |
| 9,163,727 | B2* | 10/2015 | Arata | B60J 5/0418 |
| 9,527,370 | B2* | 12/2016 | Scott | B60J 5/04 |
| 9,610,828 | B2* | 4/2017 | Suzuki | B60J 5/0418 |
| 9,908,390 | B2* | 3/2018 | Martin | B60J 5/0498 |
| 10,071,621 | B2* | 9/2018 | Coutier | B60J 9/00 |
| 2001/0017472 | A1 | 8/2001 | Nishikawa et al. | |
| 2015/0202949 | A1* | 7/2015 | Ogino | B60J 5/0418 49/465 |

FOREIGN PATENT DOCUMENTS

| | | |
|---|---|---|
| JP | 2001-191880 A | 7/2001 |
| JP | 2001-239833 A | 9/2001 |
| JP | 2007-055549 A | 3/2007 |
| JP | 2013-095256 | 5/2013 |

OTHER PUBLICATIONS

International Search Report in related application No. PCT/JP2016/064822, dated Aug. 9, 2016.

* cited by examiner

SHOCK ABSORBING STRUCTURE OF VEHICLE DOOR

TECHNICAL FIELD

The present disclosure relates to a shock absorbing structure of a vehicle door.

BACKGROUND ART

A known shock absorbing structure of a vehicle door includes a shock absorber disposed between a door trim body and a door panel. An example of such a shock absorbing structure of a vehicle door is disclosed in Patent Document 1.

RELATED ART DOCUMENT

Patent Document

Patent Document 1: Japanese Unexamined Patent Application Publication No. 2007-55549

Problem to be Solved by the Invention

To enhance a shock absorbing capability of such a shock absorber, it is preferable to increase a dimension of the shock absorber in a direction from the door panel to the door trim body (a thickness of the shock absorber). However, the shock absorber having the increased thickness may become an obstacle to another component of the vehicle door (e.g., a door inner panel).

DISCLOSURE OF THE PRESENT INVENTION

The present invention was made in view of the foregoing circumstances. An object of the present invention is to provide a shock absorbing structure including a shock absorber that has an increased dimension in a direction from a door panel to a door trim body (a thickness of the shock absorber) without contact with other components.

Means for Solving the Problem

To solve the above problem, a shock absorbing structure of a vehicle door according to the present invention has the following features. The vehicle door includes a vehicle body panel, a door trim, and a shock absorber. The vehicle body panel includes a service hole. The door trim covers the vehicle body panel from an interior side of a vehicle. The shock absorber is mounted to the vehicle body panel and covers the service hole. The shock absorber includes a shock absorbing portion inserted in the service hole. The shock absorbing portion is disposed such that an end of the shock absorbing portion on an exterior side of the vehicle is disposed more to the exterior side of the vehicle than the service hole and an end of the shock absorbing portion on the interior side of the vehicle is disposed between the vehicle body panel and the door trim.

According to the present invention, the shock absorbing portion of the shock absorber is inserted in the service hole. Therefore, the shock absorbing portion is less likely to contact the vehicle body panel and an end of the shock absorbing portion on the exterior side of the vehicle can be disposed more to the exterior side of the vehicle than the vehicle bod panel. According to the configuration, a thickness of the shock absorbing portion in an in-out direction of the vehicle can be increased. Furthermore, the service hole is covered with the shock absorber and thus a service hole cover for covering the service hole is not required.

The shock absorbing portion may include a top wall and sidewalls. The top wall may be disposed along the vehicle body panel and more to the exterior side of the vehicle than the sidewalls. The sidewalls may project from outer edges of the top wall toward the interior side of the vehicle. According to the configuration, the sidewalls collapse when an external force is applied to the top wall from the exterior side of the vehicle in a side collision and thus an impact in the side collision can be absorbed.

The shock absorbing portion may include a plate-shaped portion that covers the service hole. The shock absorbing portion may include a base section that projects from a surface of the plate-shaped portion on the interior side of the vehicle and a projecting section that projects from a surface of the plate-shaped portion of the exterior side of the vehicle. The base section may include first sidewall sections of the sidewalls. The first sidewall sections may project from the surface of the plate-shaped portion on the interior side of the vehicle. The first sidewall sections may be disposed between the vehicle body panel and the door trim. The projecting section may include the top wall and second sidewall sections of the sidewalls projecting from the surface of the plate-shaped portion on the exterior side of the vehicle. At least the top wall may be disposed more to the exterior side of the vehicle than the vehicle body panel. According to the configuration, the shock absorbing portion is less likely to contact the vehicle body panel and thus the top wall of the shock absorbing portion can be disposed more to the exterior side of the vehicle than a section of the vehicle body panel in which the service hole is provided. Therefore, a dimension of the shock absorbing portion in the width direction of the vehicle (a thickness) can be increased and a shock absorbing capability can be enhanced. Furthermore, restraint of an occupant of the vehicle in a side collision can be more quickly performed. A service hole cover for covering the service hole is not required. An exclusive through hole in the vehicle body panel is not required for inserting the shock absorbing portion.

The sidewalls may include distal ends opposed to the door trim. Each of the second sidewall sections of the shock absorbing portion may have a dimension between the plate-shaped portion and the top wall smaller than a dimension of each of the first sidewall sections between the plate-shaped portion and the distal end thereof. According to the configuration, the shock absorbing portion is less likely to contact the vehicle body panel and thus the top wall of the shock absorbing portion can be disposed more to the exterior side of the vehicle than a section of the vehicle body panel in which the service hole is provided. Therefore, a dimension of the shock absorbing portion in the width direction of the vehicle (a thickness) can be increased and shock absorbing capability can be enhanced. Furthermore, restraint of an occupant of the vehicle in a side collision can be more quickly performed. By defining the dimension of each of the second sidewall sections between the plate-shaped portion and the top wall smaller than the dimension of each of the first sidewall sections between the plate-shaped portion and the distal end thereof, the shock absorbing portion having a higher shock absorbing capability can be disposed without contacting other components.

The shock absorbing portion may have an overall size smaller than that of the service hole. The plate-shaped portion may cover a gap between the shock absorbing portion and an opening edge of the service hole. According to the configuration, the plate-shaped portion can cover the service holes except for a section in which the shock absorbing portion is inserted even if the gap is provided between the hole edge of the service hole and the shock absorbing portion. Namely, the service hole can be covered regardless of the shape of the shock absorbing portion.

The plate-shaped portion may include fixing sections in outer edge sections for fixing the shock absorber to the vehicle body panel. A section of the plate-shaped portion covering the gap between the shock absorbing portion and the opening edge of the service hole may be located between the shock absorbing portion and the fixing sections. According to the configuration, the plate-shaped portion can cover the service holes except for a section in which the shock absorbing portion is inserted even if the gap is provided between the hole edge of the service hole and the shock absorbing portion. Namely, the service hole can be covered regardless of the shape of the shock absorbing portion.

The vehicle body panel may include another service hole. The plate-shaped portion may cover the other service hole. According to the configuration, two service holes are covered with the shock absorber and service hole covers for covering the service holes are not required.

The shock absorbing portion and the plate-shaped portion may be made of the same material and integrally formed. With the plate-shaped portion, the service holes are covered regardless of the shape of the shock absorbing portion.

The vehicle body panel may be a door inner panel disposed inner than a door outer panel. The door inner panel and the door outer panel may form a storage space for storing a window glass therebetween. The shock absorbing portion may be disposed such that the top wall may be at a position more to the interior side of the vehicle than the window glass when the window glass is stored in the storage space. According to the configuration, the shock absorbing portion is less likely to contact the window glass even when the window glass is lowered.

Each of the sidewalls may have a shape with a width that decreases toward the interior side of the vehicle. According to the configuration, the sidewalls further easily collapse when an external force is applied to the top wall from the exterior side of the vehicle in a side collision. Namely, the shock absorbing capability can be further enhanced.

The shock absorbing portion may further include a rib. The rib may protrude from a surface of the top wall on the interior side of the vehicle and include at least a side edge connected to the sidewall. According to the configuration, the rib and the sidewalls collapse when an external force is applied to the top wall from the exterior side of the vehicle in a side collision. Through the collapse of the rib and the sidewalls, an impact in a side collision can be absorbed.

The shock absorbing portion may include a first end that is the top wall and a second end that is located on the interior side of the vehicle. The rib may include a distal end opposed to the door trim. The second end of the shock absorbing portion may include the distal ends of the sidewalls and the distal end of the rib. According to the configuration, the rib and the sidewalls collapse when an external force is applied to the first end of the shock absorbing portion from the exterior side of the vehicle and the second end is pressed against the door trim in a side collision. Through the collapse of the rib and the sidewalls due to the second end pressed against the door trim, an impact in a side collision can be absorbed.

Advantageous Effect of the Invention

According to the present invention, the dimension of the shock absorber in the direction from the door panel to the door trim body can be increased.

MODE FOR CARRYING OUT THE INVENTION

Figure 1:
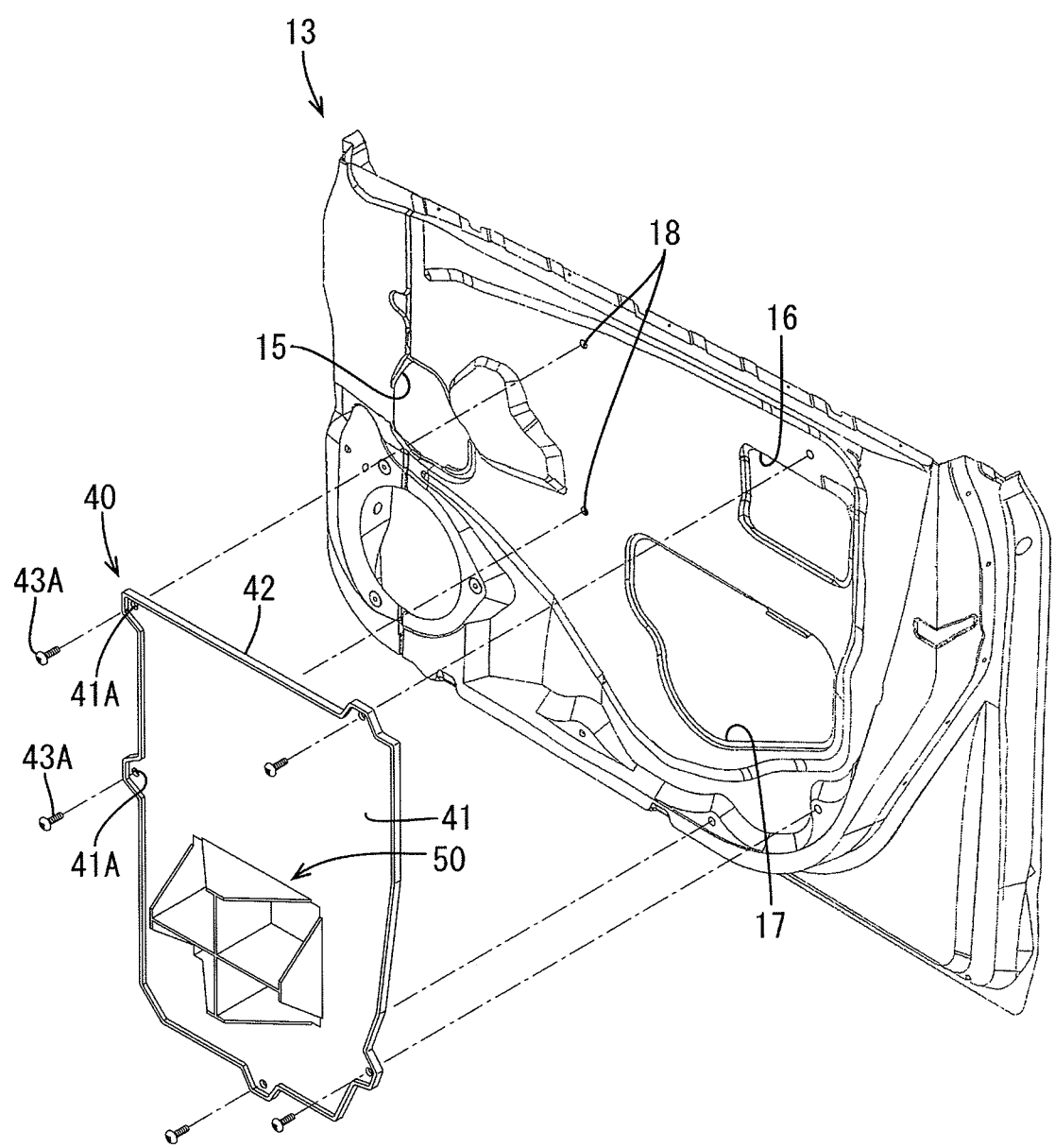
FIG. 1 is an exploded perspective view illustrating a door inner panel and a shock absorber according to an embodiment of the present invention.
Figure 2:
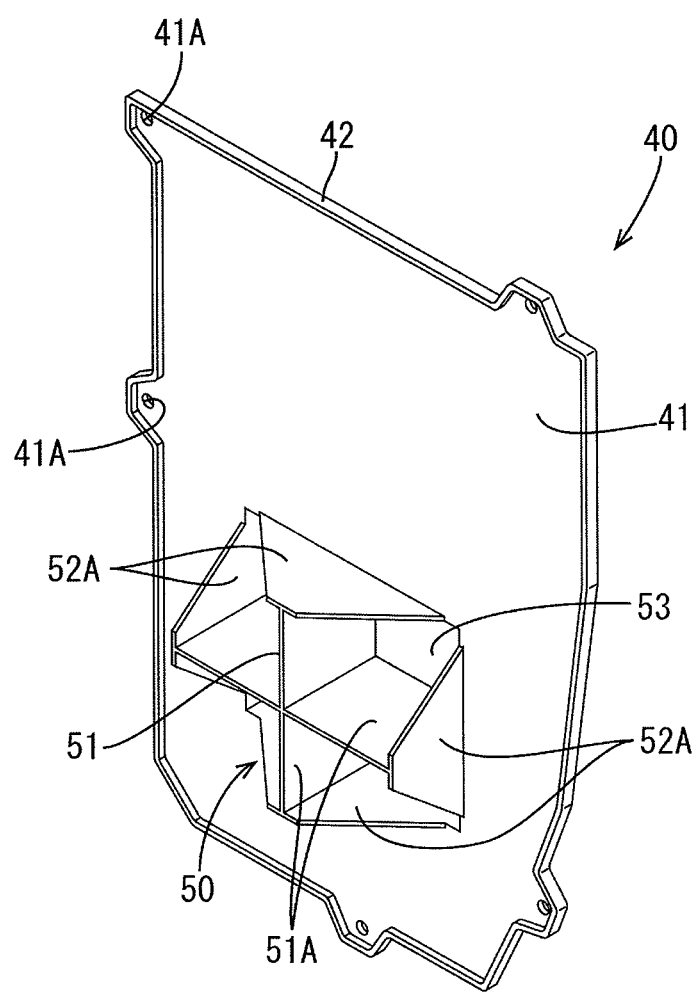
FIG. 2 is a perspective view of the shock absorber in FIG. 1 viewed from an interior side of a vehicle.
Figure 3:
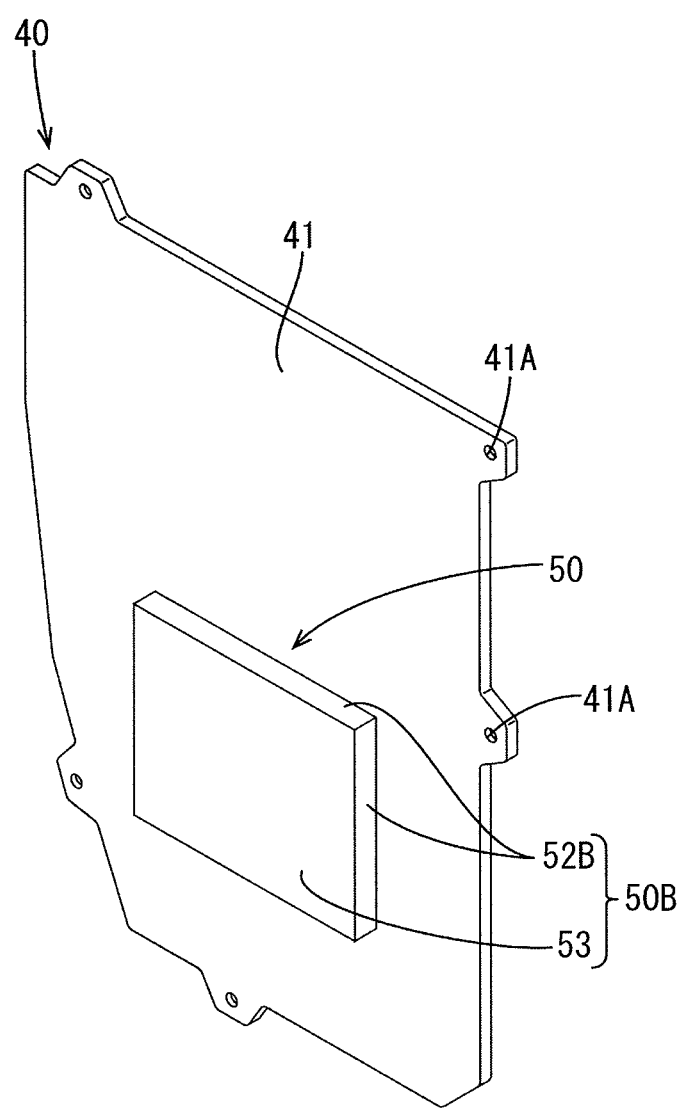
FIG. 3 is a perspective view of the shock absorber in FIG. 1 viewed from an exterior side of the vehicle.
Figure 4:
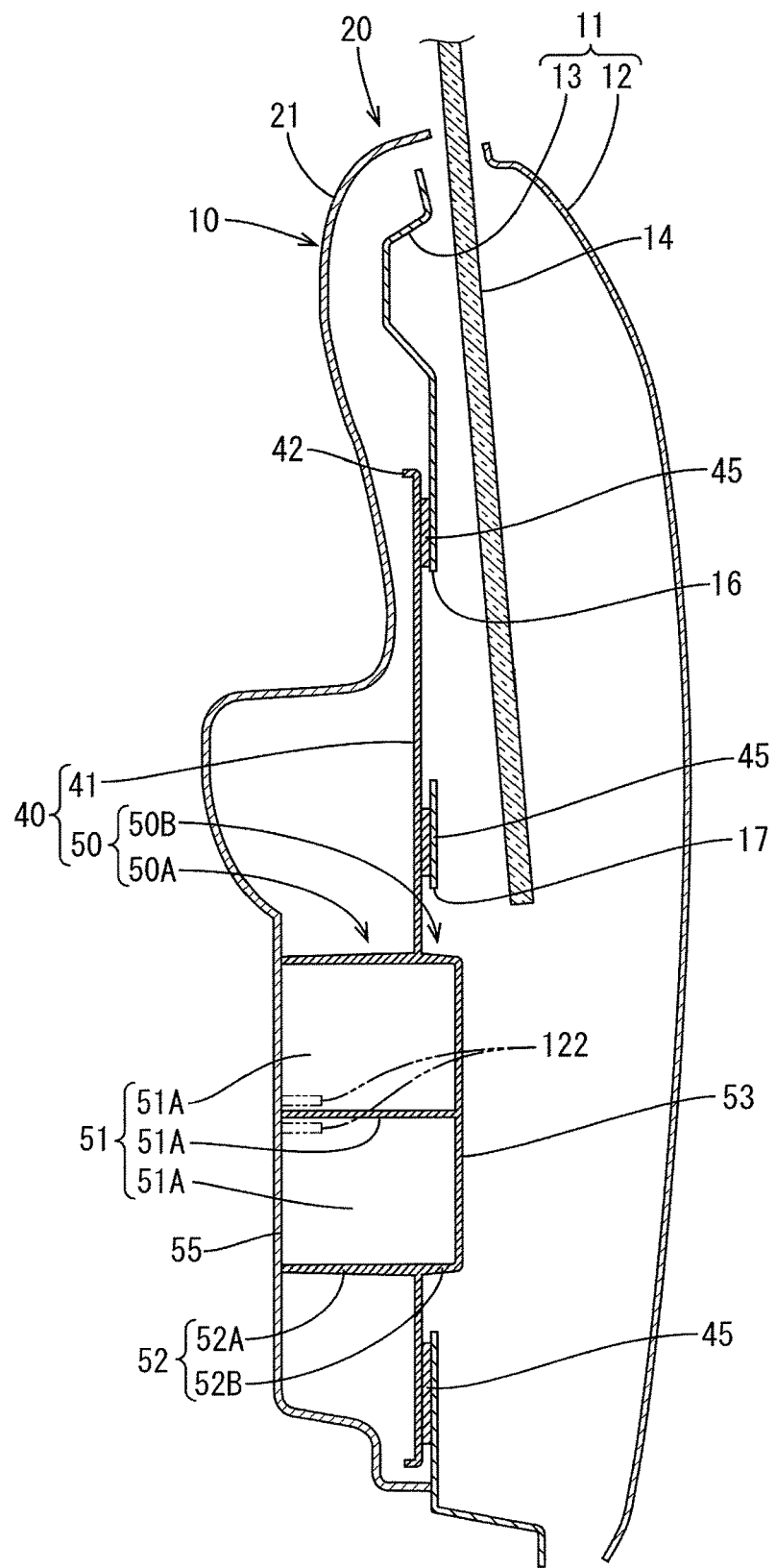
FIG. 4 is a cross-sectional view illustrating a shock absorbing structure according to the embodiment of the present invention.

An embodiment will be described with reference to FIGS. 1 to 4. A vehicle door 10 illustrated in FIG. 1 is a side door located on a side of a vehicle. As illustrated in FIG. 4, the vehicle door 10 includes a door panel 11, a door trim 20, and a shock absorber 40. The door trim 20 covers the door panel 11 from the interior side of the vehicle. The shock absorber 40 is disposed between the door panel 11 and the door trim 20.

The door panel 11 includes a door outer panel 12 and a door inner panel 13 (a vehicle body panel). The door trim 20 is mounted to the door inner panel 13 from the interior side of the vehicle. Functional components are disposed between the door inner panel 13 and the door outer panel 12. The functional components include a power window mechanism for raising and lowering a window glass 14 (including a window regulator and an electric motor), a locking mechanism for locking the vehicle door 10, and a pressure sensor. The pressure sensor is for detecting a variation in pressure inside the vehicle door 10 to detect a side impact of the vehicle. When a sharp increase in pressure inside the vehicle door 10 due to the side impact is detected, a controller installed in the vehicle activates an airbag installed in the vehicle (e.g., a side airbag). A storage space for storing the window glass 14 is provided between the door inner panel 13 and the door outer panel 12. When the window glass 14 is lowered, the window glass 14 is stored in the storage space.

As illustrated in FIGS. 1 and 4, the door inner panel 13 includes service holes 15 to 17 for mounting or maintenance of the functional components. The service hole 17 may be a service hole for the window regulator.

Next, a shock absorbing structure including the shock absorber 40 of the vehicle door 10 will be described. The shock absorber 40 is made of synthetic resin (e.g., polypropylene). As illustrated in FIGS. 1 and 2, the shock absorber 40 includes a plate-shaped portion 41 and a shock absorbing portion 50. The plate-shaped portion 41 has a size to cover the service holes 16 and 17 from the interior side of the vehicle. The plate-shaped portion 41 has a vertically long rectangular shape in an elevational view. The plate-shaped portion 41 may be configured to cover the service holes 15 to 17 or only the service hole 17. As illustrated in FIG. 4, sealing members 45 may be provided between the plate-shaped portion 41 and hole edges of the service holes 16 and 17 of the door inner panel 13.

The plate-shaped portion 41 includes mounting holes 41A (fixing portions) in edge sections thereof. The door inner panel 13 includes mounting holes 18 at positions corresponding to the mounting holes 41A. Screws 43A are passed through the mounting holes 41A from the interior side of the vehicle and then through the mounting holes 18. With the screws 43A, the shock absorber 40 is fixed to the door inner panel 13. The shock absorber 40 further includes a reinforcing rib 42 that extends for an entire perimeter of the plate-shaped portion 41 along outer edges of the plate-shaped portion 41.

As illustrated in FIG. 2, the shock absorbing portion 50 is integrally formed with the plate-shaped portion 41. The shock absorbing portion 50 has a box-like overall shape that opens toward the interior side of the vehicle. The shock absorbing portion 50 is located at a position corresponding to a hip of an occupant when the occupant is seated in a vehicle seat. As illustrated in FIG. 4, the shock absorbing portion 50 has an overall size smaller than that of the service hole 17 so that the shock absorbing portion 50 can be inserted in the service hole 17. When the shock absorbing portion 50 is inserted in the service hole 17, a gap may be created between the shock absorbing portion 50 and an opening edge of the service hole 17. The gap is covered with a section of the plate-shaped portion 41 located between the shock absorbing portion 50 and the hole edge of the service hole 17.

The shock absorbing portion 50 includes a cross-shaped rib 51 (a rib), four sidewalls 52, and a top wall 53. The cross-shaped rib 51 includes four ribs 51A that protrudes from a surface of the top wall 53 on the interior side of the vehicle in a width direction of the vehicle. The ribs 51A include first ends that are adjacent to one another. The first ends are connected with one another. The ribs 51A include second ends that are connected with the sidewalls 52, respectively.

The top wall 53 has a square shape. The top wall 53 is disposed along the door inner panel 13 and located more to the exterior side of the vehicle than the sidewalls 52. The top wall 53 is an end of the shock absorbing portion 50 on the exterior side of the vehicle. The sidewalls 52 protrude from outer edges of the top wall 53 toward the interior side of the vehicle. The sidewalls 52 are perpendicular to the respective connected ribs 51A. The sidewalls 52 are shaped such that a width decreases toward the interior side of the vehicle. In this embodiment, each sidewall 52 has a trapezoidal shape with an upper base that is smaller than a lower base and a distal end. The sidewalls 52 include first sidewall sections 52A and second sidewall sections 52B. The first sidewall sections 52A protrude from the plate-shaped portion 41 toward the interior side of the vehicle. The second sidewall sections 52B protrude from the plate-shaped portion 41 toward the exterior side of the vehicle. The top wall 53 has a square shape. The top wall 53 is an end of the shock absorbing portion 50 on the exterior side of the vehicle. The cross-shaped rib 51 protrudes from the surface of the top wall on the interior side of the vehicle.

As illustrated in FIG. 4, the shock absorbing portion 50 includes a base section 50A and a projecting section 50B. The base section 50A projects from the plate-shaped portion 41 toward the interior side of the vehicle. The projecting section 50B is a section of the shock absorbing portion 50 including the top wall 53. As illustrated in FIG. 3, the projecting section 50B projects from the plate-shaped portion 41 toward the exterior side of the vehicle. As illustrated in FIG. 4, the projecting section 50B (an inserted portion) of the shock absorbing portion 50 is inserted in the service hole 17 such that the top wall 53, which is a distal end of the projecting section 50B, is located more to the exterior side of the vehicle (the right side in FIG. 4) than a section of the door inner panel 13 in which the service hole 17 is provided. As illustrated in FIG. 4, the top wall 53 is more to the interior side of the vehicle than the window glass 14. The shock absorbing portion 50 is disposed such that the top wall 53 is located more to the interior side of the vehicle than the window glass 14 when the window glass 14 is lowered and stored in the storage space so that the shock absorbing portion 50 does not contact the window glass 14.

The base section 50A includes the first sidewall sections 52A. The base section 50A is disposed between the door inner panel 13 and the trim board 21. The projecting section 50B includes the top wall 53 and the second sidewall sections 52B. At least the single wall 53 is located more to the exterior side of the vehicle than the section of the door inner panel 13 in which the service hole 17 is provided. In this embodiment, a dimension of each second sidewall section 52B between the plate-shaped portion 41 and the top wall 53 is defined smaller than a dimension of each first sidewall section 52A between the plate-shaped portion 41 and a second end 55 (a distal end) of the shock absorbing portion 50, which will be described later. The dimension is not limited to that as described above as long as the top wall 53 does not contact the window glass 14 when the window glass 14 is lowered.

A first end of the shock absorbing portion 50 on the exterior side of the vehicle is the top wall 53 and an end of the shock absorbing portion 50 on the interior side of the vehicle is the second end 55. The second end 55 includes ends of the cross-shaped rib 51 and ends of the sidewalls 52 (the top bases of the trapezoidal shapes). The second end 55 is located more to the interior side of the vehicle than the service hole 17. Namely, the second end 55 is disposed between the trim board 21 and the door inner panel 13 to be opposed to the surface of the trim board 21 on the exterior side of the vehicle.

If the door panel 11 is deformed toward the interior side of the vehicle in a side collision of the vehicle, the top wall 53 is pressed against the door outer panel 12 from the exterior side of the vehicle. The second end 55 of the shock absorbing portion 50 is pressed against the trim board 21. The cross-shaped rib 51 and the sidewalls 52 bend. According to the configuration, an impact in the side collision can be absorbed.

Next, effects of this embodiment will be described.

In this embodiment, the shock absorbing portion 50 of the shock absorber 40 is inserted in the service hole 17. Therefore, the top wall 53 of the shock absorbing portion 50 (the end of the shock absorbing portion 50 on the exterior side of the vehicle) can be disposed more to the exterior side of the vehicle than the section of the door inner panel 13 in which the service hole 17 is provided while the shock absorbing portion 50 does not contact the door inner panel 13. Therefore, the dimension of the shock absorbing portion 50 in the width direction of the vehicle (the thickness of the shock absorbing portion 50) can be increased. According to the configuration, the shock absorbing capability can be enhanced and restraint of an occupant of the vehicle in a side collision can be more quickly performed. Furthermore, the service holes 16 and 17 are covered with the shock absorber 40. Therefore, service covers for covering the service holes 16 and 17 are not required. Because the shock absorbing portion 50 is inserted in the service hole 17, it is not required to form a through hole in the door inner panel 13 for inserting the shock absorbing portion 50.

In a shock absorbing structure including a shock absorber and a service hole cover that are provided as separate components, a door trim, the shock absorbing member, and the service hole cover are disposed in this sequence from the interior side of the vehicle. The shock absorber needs to be disposed more to the interior side of the vehicle than the service hole cover. Therefore, a dimension of the shock absorber in the width direction of the vehicle is limited. Furthermore, a clearance is required between the shock absorber and the service hole cover to avoid contact between the shock absorber and the service hole cover. The dimension of the shock absorber in the width direction of the vehicle needs to be decreased by the size of the clearance. Because this embodiment does not include the service hole cover, such a clearance is not required and thus the dimension of the shock absorber in the width direction of the vehicle can be set to a larger value.

The shock absorber 40 in this embodiment is mounted to the door inner panel 13. Therefore, the door trim 20 does not require fixing structures (e.g. mounting holes and mounting screws) for mounting the shock absorber 40. The door trim 20 is a design component and thus the fixing structures may adversely affect a design surface, that is, appearance of the design surface may decrease. This embodiment is less likely to have such a problem.

Because the trim board 21 is a design component, it is not preferable to form a through hole in the trim board 21 for mounting the shock absorber 40 to the trim board 21. To form a mounting hole for mounting the shock absorber 40 to the trim board 21, a mounting base including a mounting hole may be provided on the trim board 21. A mounting through hole formed in the door inner panel 13 does not adversely affect appearance of the trim board 21. The mounting structure for mounting the shock absorber 40 to the door inner panel 13 can be easily included in the door inner panel 13 without a special mounting structure such as a mounting base.

If the shock absorber 40 is configured to be mounted to the trim board 21, a careful mounting operation is required during mounting of the trim board 21 to the door inner panel 13 so that the shock absorber 40 does not contact the door inner panel 13. Because the shock absorber 40 is configured to be mounted to the door inner panel 13 in this embodiment, such a problem is less likely to occur.

The shock absorber 40 includes the plate-shaped portion 41 that covers the service holes 16 and 17. The shock absorbing portion 50 and the plate-shaped portion 41 are made of the same material and integrally formed. With the plate-shaped portion 41, the service holes are covered regardless of the shape of the shock absorbing portion 50. Namely, the plate-shaped portion 41 covers the service holes except for a section in which the shock absorbing portion 50 is inserted.

Generally, service hole covers are made of synthetic resin (e.g., polyethylene) and formed in a film shape. Such film-shaped service hole covers easily deform in a thickness direction. The pressure in the internal space of the vehicle door 10 may vary due to the deformation of the film-shaped surface hole covers. Namely, the pressure in the internal space of the vehicle door 10 may vary in a situation other than a side collision. This may cause errors in the pressure sensor. In this embodiment, the service holes are covered with the shock absorber 40 having rigidity higher than that of the film-shaped service cover holes. Therefore, the pressure in the internal space of the vehicle door 10 is less likely to vary in a situation other than a side collision.

OTHER EMBODIMENTS

The present invention is not limited to the embodiments described in the above description and the drawings. The following embodiments may be included in the technical scope of the present invention.

(1) Shock absorbing portions having configurations other than the configuration of the above embodiment may be included in the technical scopes of the present invention. The shock absorber in the above embodiment collapses (bends due to compression in the width direction of the vehicle) in a side collision and absorbs an impact. A shock absorbing portion formed from a formed member that is prepared by foaming urethane or PP beads may be used, for example. Furthermore, a shock absorbing portion including a rib having a shape different from that of the cross-shaped rib of the shock absorbing portion 50 may be used.

(2) The shock absorber 40 may be mounted to the door inner panel 13 with other types of fixing methods such as clips and thermal caulking.

(3) The door trim board 21 may include supporting ribs 122 illustrated with two-dot chain lines in FIG. 4 to restrict the cross-shaped rib 51 from tilting. By restricting the cross-shaped rib 51 from tilting, the cross-shaped rib 51 properly collapses in a side collision, that is, the shock absorbing capability can be enhanced.

(4) The shock absorbing portion 50 and the plate-shaped portion 41 may be provided as separate components.

EXPLANATION OF SYMBOLS

10: vehicle door, 13: door inner panel (vehicle body panel), 17: service hole, 20: door trim, 40: shock absorber, 41: plate-shaped portion, 50: shock absorbing portion, 53: top wall (end of the shock absorbing portion on an exterior side of a vehicle), 55: end of the shock absorbing portion on an interior side of the vehicle

The invention claimed is:

1. A shock absorbing structure of a vehicle door including a vehicle body panel with a plurality of service holes, the shock absorbing structure comprising:
 a door trim covering the vehicle body panel from an interior side of a vehicle; and
 a shock absorber to be mounted to vehicle body panel, including a shock absorbing portion inserted in one of the plurality of the service holes, and being disposed such that an end of the shock absorbing portion on an exterior side of the vehicle is disposed more to the exterior side of the vehicle than the one of the plurality of the service holes and an end of the shock absorbing portion on the interior side of the vehicle is disposed between the vehicle body panel and the door trim, wherein:
 the shock absorbing portion comprises a top wall and a plurality of sidewalls,
 the top wall is disposed along the vehicle body panel and more to the exterior side of the vehicle than the plurality of sidewalls,
 the plurality of sidewalls project from outer edges of the top wall toward the interior side of the vehicle,
 the plurality of service holes of the vehicle body panel includes a first service hole, a second service hole, and a third service hole, the first service hole and the second service hole being separated from each other in a horizontal direction of the vehicle body panel, the second service hole and the third service hole being separated from each other in a vertical direction of the vehicle body panel, the shock absorbing portion includes a plate-shaped portion covering the second service hole and the third service hole, the plate-shaped portion includes: a first edge and a second edge that are separated from each other in the vertical direction; and a third edge between the first edge and the second edge, the first edge includes a first fixing portion fixed to a section of the vehicle body panel above an upper edge of the second service hole, the second edge includes a second fixing portion fixed to a section of the vehicle body panel below a lower edge of the third service hole, the third edge includes a third fixing portion fixed to a section of the vehicle body panel surrounded by the first service hole, the second service hole, and the third service hole, and the shock absorbing portion is inserted in the third service hole.

2. The shock absorbing structure of the vehicle door according to claim 1, wherein the shock absorbing portion comprises a base section projecting from a surface of the plate-shaped portion on the interior side of the vehicle and a projecting section projecting from a surface of the plate-shaped portion on the exterior side of the vehicle, the base section comprises first sidewall sections of the sidewalls projecting from the surface of the plate-shaped portion on the interior side of the vehicle and being disposed between the vehicle body panel and the door trim, the projecting section comprises the top wall and second sidewall sections of the sidewalls projecting from the surface of the plate-shaped portion on the exterior side of the vehicle, and at least the top wall is disposed more to the exterior side of the vehicle than the vehicle body panel.

3. The shock absorbing structure of the vehicle door according to claim 2, wherein the sidewalls comprise distal ends opposed to the door trim, and each of the second sidewall sections of the shock absorbing portion has a dimension between the plate-shaped portion and the top wall smaller than a dimension of each of the first sidewall sections between the plate-shaped portion and the distal end thereof.

4. The shock absorbing structure of the vehicle door according to claim 2, wherein the shock absorbing portion has an overall size smaller than that of the third service hole, and the plate-shaped portion covers a gap between the shock absorbing portion and an opening edge of the third service hole.

5. The shock absorbing structure of the vehicle door according to claim 4, wherein the plate-shaped portion comprises a plurality of fixing sections in outer edge sections for fixing the shock absorber to the vehicle body panel, and a section of the plate-shaped portion covering the gap between the shock absorbing portion and the opening edge of the third service hole is located between the shock absorbing portion and the fixing sections.

6. The shock absorbing structure of the vehicle door according to claim 2, wherein the shock absorbing portion and the plate-shaped portion are made of same material and integrally formed.

7. The shock absorbing structure of the vehicle door according to claim 2, wherein the vehicle body panel is a door inner panel disposed inner than a door outer panel, the door inner panel and the door outer panel form a storage space for storing a window glass therebetween, and the shock absorbing portion is disposed such that the top wall is at a position more to the interior side of the vehicle than the window glass when the window glass is stored in the storage space.

8. The shock absorbing structure of the vehicle door according to claim 1, wherein each of the sidewalls has a trapezoidal plate shape with a width that decreases toward the interior side of the vehicle.

9. The shock absorbing structure of the vehicle door according to claim 1, wherein the shock absorbing portion further comprises a rib, and the rib protrudes from a surface of the top wall on the interior side of the vehicle and includes at least a side edge connected to the sidewall.

10. The shock absorbing structure of the vehicle door according to claim 9, wherein the shock absorbing portion includes a first end that is the top wall and a second end located on the interior side of the vehicle, the rib includes a distal end opposed to the door trim, and the second end of the shock absorbing portion includes the distal ends of the sidewalls and the distal end of the rib.

11. The shock absorbing structure of the vehicle door according to claim 1, wherein the plate-shaped portion has a vertically long rectangular shape in an elevation view.

12. The shock absorbing structure of the vehicle door according to claim 1, further comprising a reinforcing rib that extends inwardly in a vehicle width direction from an entire perimeter of the plate-shaped portion.

13. The shock absorbing structure of the vehicle door according to claim 1, wherein the plate-shaped portion has a uniform thickness in a vehicle width direction.

* * * * *